United States Patent
Nishida

(10) Patent No.: US 10,040,411 B2
(45) Date of Patent: Aug. 7, 2018

(54) ELECTRONIC CONTROL UNIT

(71) Applicant: DENSO CORPORATION, Kariya, Aichi-pref. (JP)

(72) Inventor: Miyuki Nishida, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 223 days.

(21) Appl. No.: 14/912,114

(22) PCT Filed: Jul. 29, 2014

(86) PCT No.: PCT/JP2014/003969
§ 371 (c)(1),
(2) Date: Feb. 15, 2016

(87) PCT Pub. No.: WO2015/029330
PCT Pub. Date: Mar. 5, 2015

(65) Prior Publication Data
US 2016/0193974 A1   Jul. 7, 2016

(30) Foreign Application Priority Data
Aug. 26, 2013  (JP) .................................. 2013-174666

(51) Int. Cl.
*B60L 1/00*   (2006.01)
*B60L 3/00*   (2006.01)
(Continued)

(52) U.S. Cl.
CPC ........ *B60R 16/033* (2013.01); *B60R 16/0236* (2013.01); *B60T 8/00* (2013.01); *B60T 8/885* (2013.01); *B60T 2270/406* (2013.01)

(58) Field of Classification Search
CPC ...... B60T 8/00; B60T 8/885; B60T 2270/406; B60R 16/0236; B60R 16/033
See application file for complete search history.

(56) References Cited

U.S. PATENT DOCUMENTS 5,642,063 A    6/1997  Lehikoinen
7,404,097 B2*  7/2008  Yamamoto ............... G06F 1/26
                                                701/36
(Continued)

FOREIGN PATENT DOCUMENTS

JP    H08130446 A      5/1996
JP    2001296318 A    10/2001
(Continued)

OTHER PUBLICATIONS

International Search Report and Written Opinion (in Japanese with English Translation) for PCT/JP2014/003969, dated Sep. 9, 2014; ISA/JP.

*Primary Examiner* — Jared Fureman
*Assistant Examiner* — Esayas Yeshaw
(74) *Attorney, Agent, or Firm* — Harness, Dickey & Pierce, P.L.C.

(57) ABSTRACT

An electronic control unit monitors a state of a monitor target based on an analog signal from a sensor which is supplied with electric power and which outputs the analog signal that changes in accordance with a value of the electric power and the state of the monitor target. The electronic control unit includes a first power supply, a second power supply having higher accuracy than the first power supply, and a controller. The controller supplies the power to the sensor with the first power supply and determines whether there is a change in the state of the monitor target based on the analog signal. When determining that there is the change, the controller switches over a power supply from the first power supply to the second power supply and determines whether there is a change in the state of the monitor target.

11 Claims, 4 Drawing Sheets

(51) Int. Cl.
  *H02G 3/00* (2006.01)
  *B60R 16/033* (2006.01)
  *B60T 8/00* (2006.01)
  *B60T 8/88* (2006.01)
  *B60R 16/023* (2006.01)

(56) References Cited

U.S. PATENT DOCUMENTS

| | | | |
|---|---|---|---|
| 2001/0030558 A1 | 10/2001 | Ikoma et al. | |
| 2008/0309163 A1 | 12/2008 | Hashimoto et al. | |
| 2011/0252247 A1* | 10/2011 | Yokoyama | H02J 7/34 |
| | | | 713/300 |
| 2012/0092897 A1* | 4/2012 | Hara | H02J 9/005 |
| | | | 363/16 |
| 2012/0116657 A1* | 5/2012 | Kawamoto | F02N 11/0803 |
| | | | 701/113 |
| 2013/0320931 A1* | 12/2013 | Yoshida | B60R 16/033 |
| | | | 320/135 |
| 2014/0121898 A1* | 5/2014 | Diab | G11B 20/00086 |
| | | | 701/36 |

FOREIGN PATENT DOCUMENTS

| | | |
|---|---|---|
| JP | 2004179747 A | 6/2004 |
| JP | 2006315601 A | 11/2006 |
| JP | 2009022152 A | 1/2009 |

\* cited by examiner

ELECTRONIC CONTROL UNIT

CROSS REFERENCE TO RELATED APPLICATIONS

This application is a U.S. National Phase Application under 35 U.S.C. 371 of International Application No. PCT/JP2014/003969 filed on Jul. 29, 2014 and published in Japanese as WO 2015/029330 A1 on Mar. 5, 2015. This application is based on and claims the benefit of priority from Japanese Patent Application No. 2013-174666 filed on Aug. 26, 2013. The entire disclosures of all of the above applications are incorporated herein by reference.

TECHNICAL FIELD

The present disclosure relates to an electronic control unit that monitors a state of a monitor target.

BACKGROUND ART

An electronic control unit mounted to a vehicle, such as a body control ECU which controls electric components of a vehicle, transitions to a sleep state when an ignition key is OFF, a standby state. In the sleep state, functions of the electronic control unit are stopped to a maximum extent to minimize the power consumption of a battery. The electronic control unit has a function of, during the sleep, keeping monitoring door unlock, turn on of the ignition key and the like to promptly respond to an occupant's operation.

A commonly known method of monitoring a vehicle state includes intermittently waking up a microcomputer of the electronic control unit, retrieving a signal from a sensor detecting a state of a monitor target, and determining whether or not a change in this state occurs based on the retrieved signal (see Patent Literature 1 for example). In order to reduce the power consumption while maintaining determination accuracy of the monitor target state, this method of Patent Literature 1 applies A/D sampling to an analog signal from the sensor when the microcomputer is intermittently waked up, and determines whether or not an obtained digital signal exceeds a predetermined threshold. When the digital signal exceeds the threshold, a wakeup cycle of the microcomputer is shortened and the occurrence and non-occurrence of the change in the monitor target state are determined.

PRIOR ART LITERATURES

Patent Literature

Patent Literature 1: JP2006-315601A

SUMMARY OF INVENTION

In some cases, a sensor used to detect a state of a monitor target may be a sensor (e.g., potentiometer) that is supplied with a reference voltage and outputs an analog signal with reference to this reference voltage. In this case, if accuracy of the reference voltage, that is, accuracy of a power supply which supplies the reference voltage, is low, the state of the monitor target may be wrongly detected. Additionally, when the wakeup cycle is shorted in order to improve the detection accuracy as is the case in the method of Patent Literature 1, the power consumption may increase.

The present disclosure is made in view of the foregoing and has an object to provide an electronic control unit that can highly accurately detect and determine a state of a monitor target while minimizing power consumption.

In an example of the present disclosure, an electronic control unit monitors a state of a monitor target based on an analog signal from a sensor which is supplied with electric power and which outputs the analog signal that changes in accordance with a value of the electric power and the state of the monitor target. The electronic control unit comprises: a first power supply; a second power supply having higher accuracy than the first power supply; and a controller that performs a first determination by supplying the power to the sensor with the first power supply and determining occurrence and non-occurrence of a change in the state of the monitor target based on the analog signal, and that when determining the occurrence of the change in the state of the monitor target in the first determination, performs a second determination by switching over a power supply supplying the power to the sensor from the first power supply to the second power supply and determining occurrence and non-occurrence of the change in the state of the monitor target.

This electronic control unit includes the first power supply and the second power supply having higher accuracy than the first power supply, as power supplies for supplying power to the sensor which detects the state of the monitor target. The controller performs the first determination using the lower accuracy first power supply. Thereafter, when determining the occurrence of the change in the state of the monitor target in the first determination, the controller switches the power supply into the high accuracy second power supply and then performs the second determination. Therefore, the state of the monitor target can be highly accurately detected as compared with a case where the monitoring is performed with only the first power supply. Additionally, although the use of a high accuracy power supply for monitoring may cause much more consumption than the use of a low accuracy power supply, the high accuracy power supply (second power supply) is used when the first determination determines the occurrence of the change in the present disclosure. Therefore, the power consumption can be suppressed as compared with a case where the high accuracy power supply is always used.

EMBODIMENTS FOR CARRYING OUT INVENTION

Figure 1:
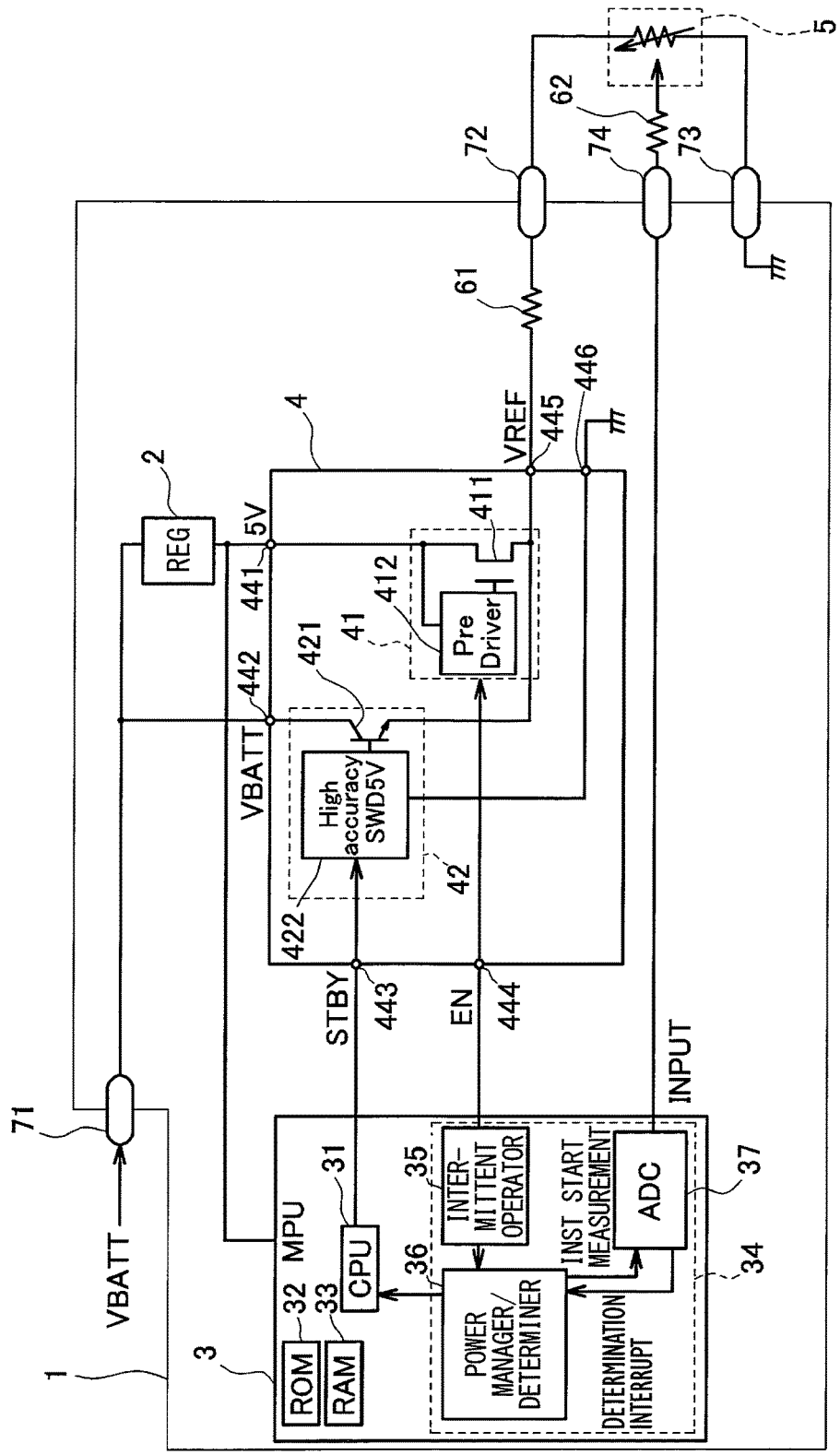
FIG. 1 is a schematic diagram illustrating an in-vehicle system.
Figure 4:
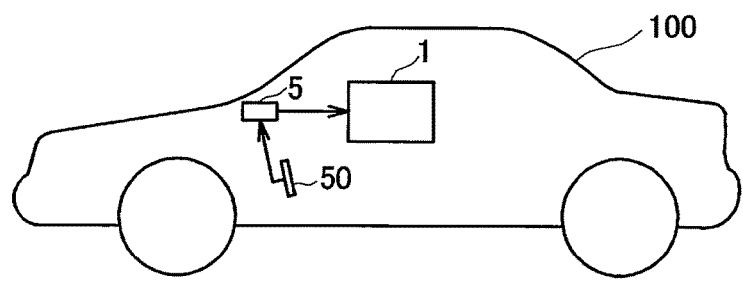
FIG. 4 is a diagram illustrating a vehicle and an in-vehicle system mounted to the vehicle.

Embodiments will be described with reference to the drawings. FIG. 1 is a schematic diagram illustrating an in-vehicle system. The in-vehicle system of FIG. 1 is mounted to a vehicle 100 illustrated in FIG. 4. This in-vehicle system includes an ECU (Electronic Control Unit) 1 and a sensor 5.

The sensor 5 detects a state of a predetermined part of the vehicle 100. Specifically, the sensor 5 detects an operation (press down) of a brake pedal 50 (see FIG. 4) of the vehicle 100. The brake pedal 50 is provided in a driver's underfoot region of the vehicle 100 and acts as an operation part which the driver presses down with his foot in braking the vehicle 100. The sensor 5 includes a variable resistor whose resistance changes according to the position of the brake pedal 50. According to the resistance of the variable resistor, the sensor 5 (potentiometer) outputs an electrical signal (analog signal) as a signal indicating the position of the brake pedal 50. Specifically, the sensor 5 is used in such a way that a reference voltage is supplied to the variable resistor. The sensor 5 outputs the electrical signal according to the reference voltage and the resistance of the variable resistor. In the sensor 5, one end of the variable resistor is connected to a reference voltage terminal 72 of the ECU 1 and the other end is connected to a ground terminal 73 of the ECU 1. An output terminal of the sensor 5 is connected to a resistor 62 via an input terminal 74 of the ECU 1.

The ECU 1 corresponds to an electronic control unit in the present disclosure and monitors an operation state of the brake pedal 50 (presence and absence of the operation, an amount of the operation) based on the electrical signal outputted from the sensor 5. The ECU 1 includes a regulator 2, a MPU (Micro Processing Unit) 3 and a power-supply IC 4. The ECU 1 includes an input terminal 71 to which a battery voltage VBATT (e.g., 12V) is inputted.

The battery voltage VBATT is inputted to the regulator 2 via the input terminal 71. The regulator 2, which acts as a voltage adjuster, converts the battery voltage VBATT into a predetermined voltage (specifically, 5V) and outputs the converted voltage. The regulator 2 employed may be a linear regulator, a switching regulator or the like. The regulator 2 and the below-described switching circuit 41 constitute "low accuracy power supply (first power supply)" in the present disclosure. That is, the regulator 2 has lower accuracy in output voltage than the below-described regulator 42 (second power supply). Specifically, the regulator 2 outputs a voltage 5V with an error ±0.2V. The regulator 2 is always ON. In other words, the regulator 2 is kept ON even when the ECU 1 is in the sleep state.

The MPU 3 is supplied with the voltage (5V) adjusted by the regulator 2 and operates by this voltage. The MPU 3 is a microcomputer which includes a CPU 31, a ROM 32, a RAM 33 etc., and which mainly performs a process of monitoring a state of the sensor 5, i.e., a state of the brake pedal 50. When the MPU 3 fully starts up, the CPU 31 operates. For example, the CPU 31 monitors the state of the sensor 5 and performs a process corresponding to the state. The CPU 31 is connected to a STBY terminal 443 of the power supply IC 4 described below. The ROM 32 is a memory which stores control programs executed by the CPU 31 and the like. The RAM 33 is a memory which temporarily stores various information in the execution of processing by the CPU 31. The MPU 3 corresponds to a controller in the present disclosure.

When the ECU 1 transitions to the sleep mode, the MPU 3 causes the CPU 31 to stop operating and thereby minimizes the power consumption. The MPU 3 includes a function unit 34 separated from the CPU 31. The function unit 34 has a function to monitor the state of the sensor 5 even when the ECU 1 is in the sleep. The function unit 34 includes an intermittent operation section 35, a power management/determination section 36 and an ADC 37.

The intermittent operation section 35 is connected to an EN terminal 444 of the below-described power supply IC 4. The intermittent operation section 35 continues operating even when the MPU 3 is in the sleep and counts a time during the sleep. Each time a predetermined set time passes, i.e., in an intermittent manner, the intermittent operation section 35 outputs an EN signal (called an enable signal and corresponding to "first trigger signal" in the present disclosure") and inputs the EN signal to the EN terminal 444, wherein the EN signal is a signal instructing supply of the below-described low accuracy power to the sensor 5. In synchronization with outputting the EN signal, the intermittent operation section 35 starts the power management/determination section 36. The intermittent operation section 35 corresponds to a first signal outputter in the present disclosure.

The power management/determination section 36 controls a range of supplying the power inside the MPU 3. Specifically, when the ECU 1 is in the wakeup state or the below-described pre-wakeup state, the power management/determination section 36 supplies the power to all the parts including the CPU 31 to fully start the MPU 3. When the ECU 1 is in the sleep state, the power management/determination section 36 limits the range of supplying the power inside the MPU 3. Specifically, When the ECU 1 is in the sleep state, the power management/determination section 36 stops the supply of power to the CPU 31, that is, places the CPU 31 in the operation stop.

When the ECU 1 (MPU 3) is in the sleep state, the power management/determination section 36 itself is in the operation stop state as long as not being instructed to start by the intermittent operation section 35. In other words, during the sleep, the power management/determination section 36 operates only when the intermittent operation section 35 outputs the EN signal. The power management/determination section 36 instructs the ADC 37 to perform AD measurement and determines occurrence and non-occurrence of a change in the state of the sensor 5 based on an AD measurement value (digital signal) obtained by the AD measurement, that is, determines whether or not there is a change in state of the brake pedal 50.

The ADC 37 retrieves the output signal (analog signal) of the sensor 5, which is inputted via the input terminal 74 of the ECU 1. The ADC 37 (AD converter) performs AD measurement which converts the retrieved analog signal into a digital signal. The ADC 37 performs the AD measurement based on the instructions from the power management/determination section 36.

With the CPU 31 or the function unit 34, the MPU 3 performs control to switch over the operating state of the ECU 1 among three states, which are the sleep mode, the pre-wakeup mode and the wakeup mode. Additionally the MPU 3 instructs the power supply IC 4 to control the power supplied to the sensor 5 (power on/off, switch over between the low accuracy power supply and the high accuracy power supply). Specific description of these processes will be given later.

The power supply IC is an IC (integrated circuit) which controls the power supplied to the sensor 5. The power supply IC 4 includes a switching circuit 41 and a high accuracy regulator 42. The power supply IC 4 includes a first power input terminal 441 to which the voltage adjusted by the regulator 2 is inputted and an output terminal 445 from which the reference voltage VREF supplied to the sensor 5 is outputted. In a line 451 between these terminals 441 and 445, the switching circuit 41 is provided. The switching circuit 41 includes a switching element 411 which switches over the line 451 between electrical connection and disconnection, a drive circuit 412 which controls on and off of the switching element 411, and the like.

The drive circuit 412 is connected to the EN terminal 444, and operates and turns on the switching element 411 when the EN signal is inputted from the EN terminal 444. When the EN signal is not inputted, the drive circuit 412 is in the operation stop and the switching element 411 is off. When the switching element 411 is on, the switching circuit 41 outputs the voltage of the regulator 2, which has lower accuracy than that of the high accuracy regulator 42, to the output terminal 445. In the below, the switching circuit 41 is also called a low accuracy power supply.

The power supply IC 4 includes a second power input terminal 442 to which the battery voltage VBATT from the input terminal 71 is inputted. In a line 452 between the second power input terminal 442 and the output terminal 445, the high accuracy regulator 42 is provided. The battery voltage VBATT is inputted from the second power input terminal 442 to the inside of the power supply IC 4. The high accuracy regulator 42 converts this battery voltage VBATT into a predetermined voltage (specifically, 5V) and outputs the voltage after the conversion.

The high accuracy regulator 42 includes, for example, a transistor 421 which is provided in the line 452, a drive circuit 422 which controls operation of the transistor 421, and the like. The drive circuit 422 controls the operation of the transistor 421 so that the inputted battery voltage VBATT is stepped down to the predetermined voltage (5V) at the transistor 421.

The drive circuit 422 is connected to the STBY terminal 443 and operates when receiving a signal (STBY signal) from the STBY terminal 443. The drive circuit 422 controls the transistor 421 to output the voltage of 5V. This 5V voltage is outputted to the output terminal 445. When the STBY signal is not inputted, the drive circuit 422 is in the operation stop and the transistor 421 is in the off state to disconnect the line 452. Accordingly, the high accuracy regulator 42 does not output the voltage of 5V. The drive circuit 422 is connected to ground via a ground terminal 446 of the power supply IC 4.

The high accuracy regulator 42 outputs a higher accuracy voltage than the low accuracy power supply 41. Specifically, the high accuracy regulator 42 outputs, for example, the voltage of 5V with an error of ±X (mV). The error of the high accuracy regulator 42 is a millivolt order and smaller than the error of the low accuracy power supply 41 (regulator 2). In the below, the high accuracy regulator 42 is also called a high accuracy power supply.

Because of outputting the high accuracy voltage, the high accuracy power supply 42 may have a more complicated configuration than the low accuracy power supply 41 and tends to consume much more electric power than the low accuracy power supply 41. For example, the power consumption of the high accuracy power supply 42 may be 2 mA, while the power consumption of the low accuracy power supply 41 may be 5 μA.

The output terminal 445 is connected to the reference voltage terminal 72 via a resistor 61. The reference voltages VREF of the low accuracy power 41 or the high accuracy power supply 42, which is outputted from the power supply IC 4 (output terminal 445), is outputted from the reference voltage terminal 72 and supplied to the sensor 5. Strictly speaking, the sensor 5 is supplied with the voltage that is obtained by dividing the reference voltage VREF with the resistor 61 and a resistor of the sensor 5.

Figure 2:
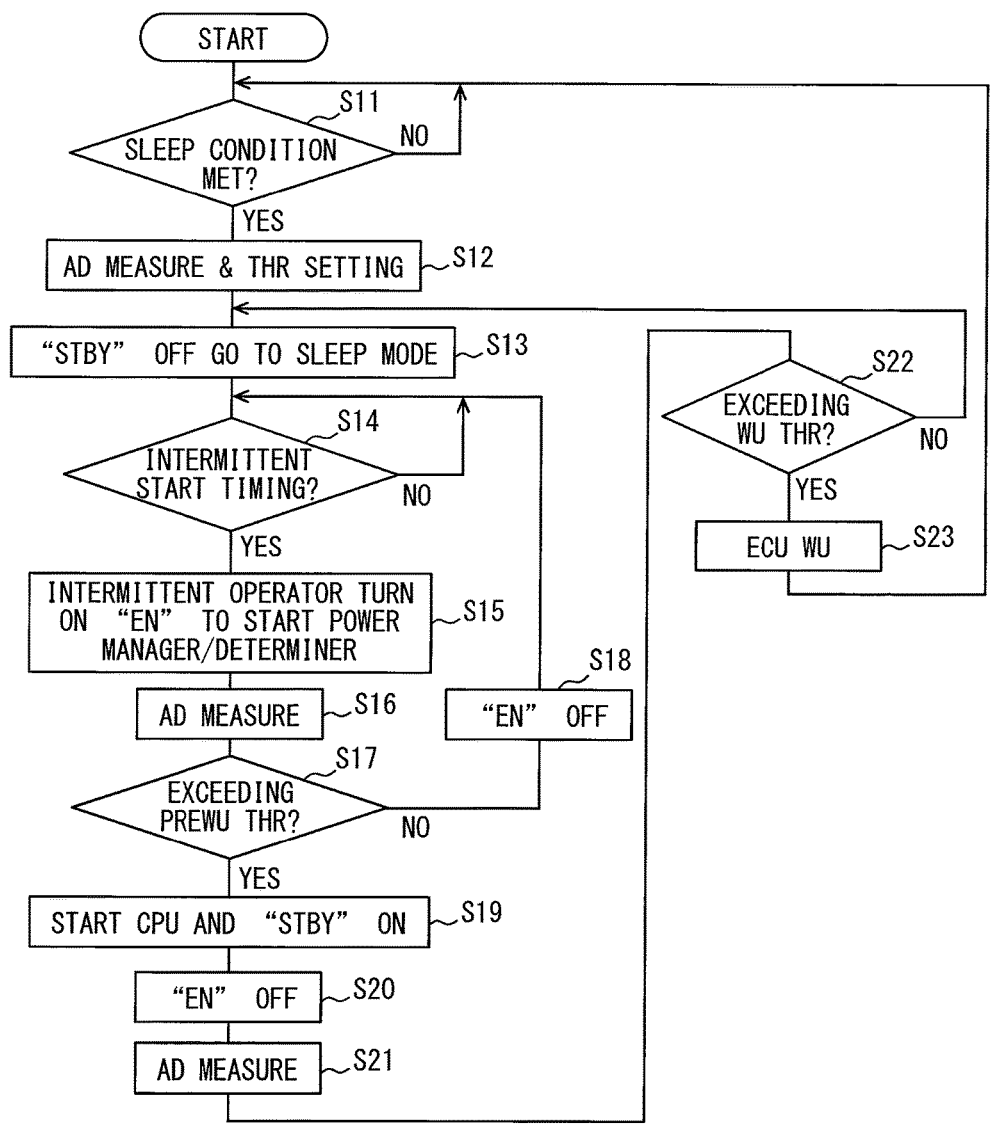
FIG. 2 is a flowchart illustrating processing executed by a MPU.
Figure 3:
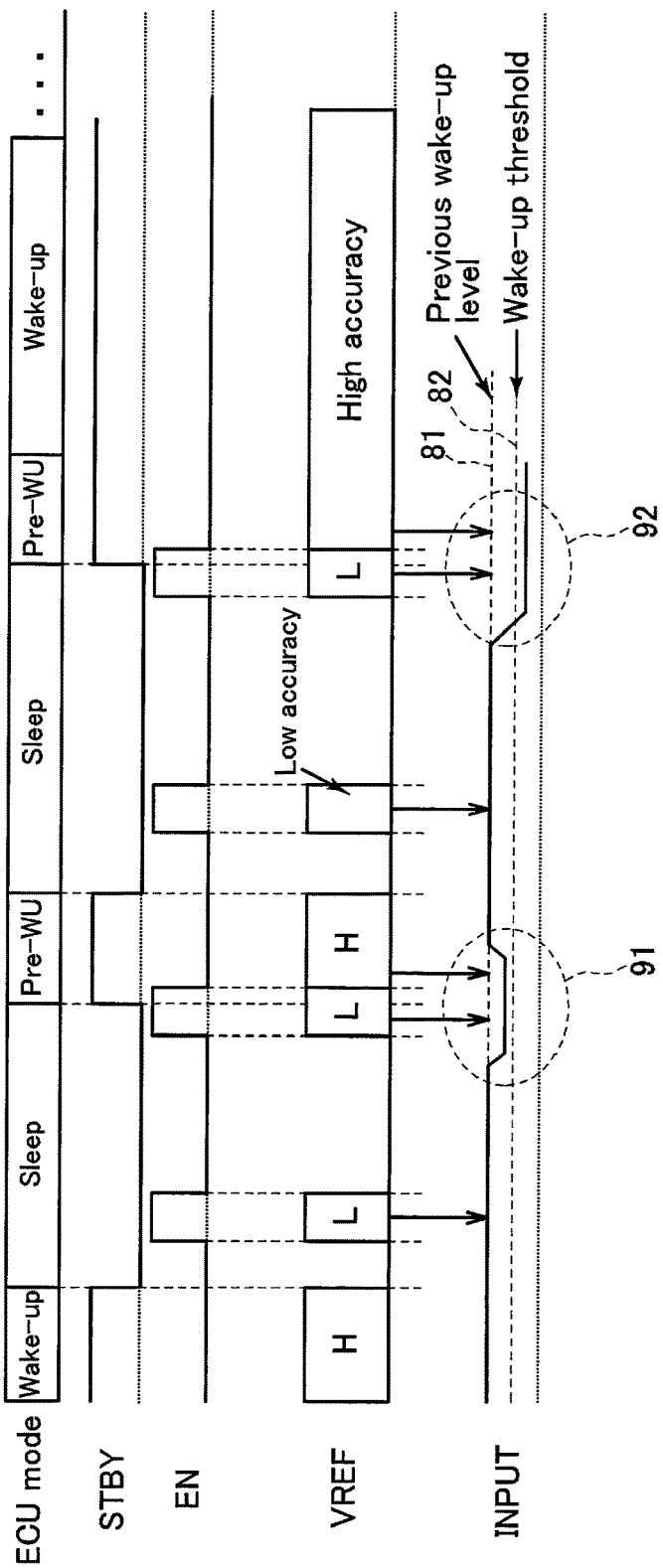
FIG. 3 is a timing chart illustrating ECU modes and various signals on a time basis.

Next, processes executed by the MPU 3 will be described in details. FIG. 2 is a flowchart illustrating processes executed by the MPU 3. FIG. 3 is a timing chart illustrating modes of the EUC 1 and various signals with a time axis. Specifically, from the top, FIG. 3 illustrates modes of the ECU 1, the STBY signal, the EN signal, the reference voltage VREF, and the input signal INPUT from the sensor 5 to the ADC 37. In the timing chart of the reference voltage VREF of FIG. 3, "Low accuracy" and "L" refer to a state where the voltage of the low accuracy power supply 41 is the reference voltage VREF. "High accuracy" and "H" refer to a state where the voltage of the high accuracy power supply 42 is the reference voltage VREF. For example, the processing of FIG. 2 starts at a time when the ECU 1 wakes up for the first time (e.g., at a time when the ignition power is turned on for the first time after vehicle shipping). The wakeup of the ECU 1 refers to start of all the configurations (devices) inside the ECU 1.

When the ECU 1 is in the wakeup state, the CPU 31 reads the control program stored in the ROM 32 and executes processing in accordance with the control program. Specifically, in the wakeup state, the CPU 31 (corresponding to a signal outputter in the present disclosure) outputs the STBY signal (corresponding to a second trigger signal in the present disclosure), so that the STBY signal is inputted to the STBY terminal 443 of the power supply IC 4 (see FIG. 3). In the wakeup state, the MPU 3 stops the output of the EN signal. Accordingly, when the ECU 1 is in the wakeup state, the reference voltage VREF "H" based on the high accuracy power supply 42 is outputted from the power supply IC 4 (output terminal 445) and is supplied to the sensor 5 (see FIG. 3).

In the wakeup state, the MPU 3 retrieves the analog signal (analog voltage) that is outputted from the sensor 5 driven by the reference voltage VREF "H". The ADC 37 coverts the analog signal into the digital signal with the MPU 3 and monitors the state of the brake pedal 50 based on a value of the digital signal (measurement value of the sensor 5). Specifically, the MPU 3 determines the presence and absence of the operation of the brake pedal 50 and the amount of the operation when it is operated. This determination is made by the power management/determination section 36 or the CPU 31.

Upon start of the processing of FIG. 2, the CPU 31 determines whether or not a condition (sleep condition) for the ECU 1 to transition to the sleep state is met (S11). Specifically, when the ignition power of the vehicle 100 is off and the signal of the sensor 5 is less than a second threshold, the CPU 31 determines that the sleep condition is met. The second threshold is provided for distinguishing between the wakeup mode and a low-power consumption mode (sleep mode, pre-wakeup mode). When the sleep condition is not met (S11: No), satisfaction of the sleep condition is waited for. In this case, the wakeup state of the ECU 1 is maintained.

When the sleep condition is met (S11: Yes), the CPU 31, before placing the ECU 1 in the sleep state, retrieves the analog signal of the sensor 5 at the present time, i.e., at the time of the satisfaction of the sleep condition and coverts the analog signal into the digital signal with the ADC 37 (AD measurement, S12). Then, based on the value of the digital signal (AD measurement value) (corresponding to a reference signal in the present disclosure) obtained by the AD measurement, the CPU 31 sets a threshold (S12) for distinguishing between occurrence and non-occurrence of a change in state of the sensor 5 (brake pedal 50).

Specifically, as a threshold for the ECU 1 to transition from the sleep state to the pre-wakeup state, the CPU 31 (S12) sets a first threshold that has the same value as the AD measurement value obtained by the AD measurement at S12. This first threshold is a value indicating the position of the brake pedal 50 at a time of transition to the sleep mode, that is, the position of the brake pedal 50 (default position of the brake pedal 50) at a time of no operation of the brake pedal 50.

Additionally, as a threshold for the ECU 1 to transition from the pre-wakeup state to the wakeup state, the CPU 31 (S12) sets a second threshold which is different from the first threshold. This second threshold may be set, for example, with reference to the first threshold or may be set to a predetermined value independently of the first threshold. When the second threshold is set with reference to the first threshold, a predetermined value added to the first threshold is set as the second threshold. Because the first threshold is set to the default position of the brake pedal 50, the second threshold is larger than the first threshold in a direction of operating the brake pedal 50. The CPU 31 performing S12 corresponds to a threshold setter in the present disclosure.

In the timing chart of INPUT in FIG. 3, the line 81 refers to the first threshold and the line 82 refers to the second threshold. The CPU 31 sets the first threshold and the second threshold in the power management/determination section 36.

Next, the CPU 31 stops the output of the STBY signal (see FIG. 3) and stops the functions of the ECU 1 including the CPU 31 itself (all the functions except the function unit 34); thereby the ECU 1 transitions to the sleep mode (S13). It is noted that as described above, even after the transition to the sleep mode, the intermittent operation section 35 continues operating.

Next, the intermittent operation section 35 determines (S14) whether or not an intermittent start timing, which is a pre-designated time, has come. When the intermittent start timing has not come (S14: No), the intermittent operation section 35 waits for the intermittent start timing to come. When the intermittent start timing has come (S14: Yes), the intermittent operation section outputs the EN signal (see FIG. 3) and starts the power management/determination section 36 (S15). Accordingly, the reference voltage VREF "L" of the low accuracy power supply 41 is outputted from the power supply IC 4 and is supplied to the sensor 5 (see FIG. 3).

The power management/determination section 36 instructs the ADC 37 to start the AD measurement (S16). The power management/determination section 36 determines whether or not the AD measurement value obtained in the AD measurement at S17 exceeds the first threshold (S17). When not exceeding (S17: No), the power management/determination section 36 regards no operation of the brake pedal 50 and notifies this to the intermittent operation section 35 and the intermittent operation section 35 stops outputting the EN signal (S18). Thereafter, the process returns to S14. In this way, the power supply IC 4 stops outputting the reference voltage VREF "L".

As described above, when the ECU 1 is in the sleep mode and there is no output of the EN signal, only the intermittent operation section 35 operates. When the ECU 1 is in the sleep mode and there is the output of the EN signal, the power management/determination section 36, the ADC 37 and the low accuracy power supply 41 operate.

When the AD measurement value is larger than the first threshold (see the line 81 in FIG. 3) as shown by the circles 91, 92 in FIG. 3 (S17: Yes), the power management/determination section 36 starts and the ECU 1 transitions to the pre-wakeup state (S19) on assumption that there is a possibility that the brake pedal 50 is operated. Then, the CPU 31 starts outputting the STBY signal (S19). Accordingly, the reference voltage VREF "H" of the high accuracy power supply 42 is outputted from the power supply IC 4 and is supplied to the sensor 5 (see FIG. 3). Upon transition to the pre-wakeup mode, the intermittent operation section 35 stops outputting the EN signal (S20).

In the pre-wakeup, the MPU 3 is in the fully started state, and out of devices inside the ECU 1, the MPU 3 and the power supply IC (high accuracy power supply 42) are in the started state, and the other devices (such as the communication circuit for performing communication with another ECU) is in the operation stop state.

Next, the MPU 3 performs the AD measurement with the ADC 37 (S21) and determines whether or not this AD measurement value is larger than the second threshold set at S12 (S22). As shown in the circle 91 in FIG. 3, when the AD measurement value is not larger than the second threshold (S22: No), the process returns to S13 and the ECU 1 transitions to the sleep again (see FIG. 3) on assumption that the brake pedal 50 is not operated.

As shown in the circuit 92 in FIG. 3, when the AD measurement value is larger than the second threshold (S22: Yes), the MPU 3 makes the ECU 1 wakeup (S23), by finally deciding that the brake pedal 50 is operated. Accordingly, the MPU 3 makes all the devices inside the ECU 1 start. Thereafter, the process returns to S11. Accordingly, the ECU 1 becomes able to promptly respond to the occupant's operation of the vehicle 100 (e.g., operation of turning on the ignition power).

In the present embodiment described above, during the sleep state, the function unit 34 intermittently monitors the state of the brake pedal 50 while the CPU 31 is in the operation stop. This can suppress the power consumption of the ECU 1. Moreover, during the sleep state, because the low accuracy power supply 41 is used to monitor the state of the brake pedal 50, the power consumption can be suppressed as compared with cases when the high accuracy power supply 42 is used. Moreover, during the sleep state, because the sensor 5 is supplied with the power from the low accuracy power supply 41 in an intermittent manner, i.e., only at the AD measurement, the power consumption can be suppressed as compared with cases where the power is continuously supplied during the sleep.

Moreover, because the first threshold for the transition from the sleep state is set based on the signal of the sensor 5 at a time of the transition to the sleep, even if the position of the non-operated brake pedal 50 (default position) differs from vehicle to vehicle, this is took into account in setting the threshold. Because of this, the state of the brake pedal 50 can be detected with high accuracy. Moreover, because the first threshold is set to the value that is the same as the AD measurement value measured at the time of the transition to the sleep, a change in the position of the brake pedal 50 from the non-operated state can be promptly detected.

Moreover, when the AD measurement value exceeds the first threshold during the sleep state, it does not fully wakeup but it transitions to the pre-wakeup which is lower in the start level than the wakeup. Therefore, the power consumption can be suppressed as compared with configurations where it transitions directly from the sleep to the wakeup. In this pre-wakeup state, because the power supplied to the sensor 5 has switched over from the low accuracy power supply 41 to the high accuracy power supply 42, the state of the brake pedal 50 can be detected with high accuracy. In other words, error detection of the state of the brake pedal 50 can be prevented. Specifically, determining that the brake pedal 50 is operated although it is not actually operated, and determining that the brake pedal 50 is not operated although it is actually operated can be prevented. This can reduce the frequency of fully-wakeup and thus suppress the power consumption.

Moreover, because the second threshold for transition from the pre-wakeup state to the wakeup state is set to a position that is deeper than the position of the non-operated brake pedal 50, an erroneous determination can be prevented. The erroneous determination is a determination that the brake pedal 50 is operated although it is not actually operated. Therefore, it is possible to prevent that it wrongly wakes up although the wakeup is not necessary. The power consumption can be suppressed.

Moreover, when the AD measurement is not larger than the second threshold during the pre-wakeup state, it returns to the sleep state again. This can reduce the power consumption. As can be seen from the above, the present embodiment can detect and determine the state of the brake pedal while suppressing the power consumption of the ECU in the sleep state.

The above-illustrated embodiments do not limit embodiments of the present disclosure and can be modified in various ways. For example, although the above embodiments illustrates monitoring the operation state of the brake pedal, technical ideas of the present disclosure are applicable to monitoring a vehicle state other than the brake pedal as long as it uses a sensor, such as a potentiometer or the like, which outputs an analog signal according to position. Although the above embodiments illustrate a single IC implementing the high accuracy power supply and the low accuracy power supply, the high accuracy power supply and the low accuracy power supply may be provided separately.

In the above embodiments, the first threshold is set to a value that is the same as the AD measurement value at the time of transition to the sleep. Alternatively, the first threshold may be set to other values. The first threshold and the second threshold may be set to the same value. In this case, like the first threshold, the second threshold may be set to a value that is the same as the AD measurement value at the time of transition to the sleep, that is, may be set to the default position of the brake pedal. Additionally, technical ideas of the present disclosure may be applied to detecting a state of a monitor target at a time when an electronic control unit is in the wakeup. Specifically, during the wakeup state, a temporal determination of the state change may be made using the low accuracy power supply. When the temporal determination determines occurrence of the state change, the power may be switched over to the high accuracy power supply and then the presence and absence of the state change may be finally decided. Because the high accuracy power supply typically consumes much more electric power than the low accuracy power supply, the power consumption can be suppressed as compared with cases where the high accuracy power supply is always used. Additionally, the state of the monitor target can be detected with high accuracy, as compared with cases where only the low accuracy power supply is used.

What is claimed is:

1. An electronic control unit that monitors a state of a monitor target based on an analog signal from a sensor which is supplied with electric power and which outputs the analog signal that changes in accordance with a value of the electric power and the state of the monitor target, the electronic control unit comprising:
   a first power supply;
   a second power supply having higher accuracy than the first power supply; and
   a controller that
      performs a first determination by supplying the power to the sensor with the first power supply and determining occurrence and non-occurrence of a change in the state of the monitor target based on the analog signal, and
      when determining the occurrence of the change in the state of the monitor target in the first determination, performs a second determination by switching over a power supply supplying the power to the sensor from the first power supply to the second power supply and determining occurrence and non-occurrence of the change in the state of the monitor target.

2. The electronic control unit according to claim 1, wherein:
   in a low power consumption mode in which power consumption of the electric control unit is smaller than in a wakeup mode, the controller intermittently performs the first determination;
   when determining the occurrence of the change in the state of the monitor target in the first determination, the controller performs the second determination; and
   when determining the occurrence of the change in the state of the monitor target in the second determination, the controller wakes up the electronic control unit.

3. The electronic control unit according to claim 1, wherein:
   the controller includes a function unit that intermittently performs the first determination during a sleep state of the electronic control unit;
   when the function unit determines the occurrence of the change in the state of the monitor target, the controller performs the second determination by changing the electronic control unit from the sleep state to a pre-wakeup state in which a function needed to perform the second determination is started; and
   when determining the occurrence of the change in the state of the monitor target in the second determination, the controller returns the electronic control unit to the sleep state.

4. The electronic control unit according to claim 3, wherein the function unit includes:
   an AD converter that converts the analog signal into a digital signal;
   a determinator that determines occurrence and non-occurrence of the change in the state of the monitor target based on the digital signal obtained by conversion of the AD converter; and
   a first signal outputter that, during the sleep state of the electronic control unit, intermittently outputs a first trigger signal which triggers the first power supply to supply the power to the sensor, and
   wherein the AD converter and the determinator start up in synchronization with output of the first trigger signal.

5. The electronic control unit according to claim 4, wherein:
   the controller further includes
      a second signal outputter that is separated from the function unit and that outputs a second trigger signal which triggers the second power supply to supply the power to the sensor;
   when the function unit determines the occurrence of the change in the state of the monitor target in the first determination, the controller changes the electronic control unit into the pre-wakeup state in which, in addition to the function unit, the second signal outputter is started; and
   in the pre-wakeup state, the output of the first trigger signal is stopped and the second determination is performed based on the digital signal obtained by the conversion of the AD converter.

6. The electronic control unit according to claim 1, wherein:

the controller includes
  a threshold setter that sets a first threshold based on a reference signal that is the signal outputted from the sensor at a time of transition of the electronic control unit from a wakeup state to a sleep state, wherein the first threshold is a threshold for distinguishing between the occurrence of the change in the state of the monitor target and non-occurrence of the change in the state of the monitor target; and
  in the first determination, the controller determines the occurrence of the change in the state of the monitor target when the signal from the sensor exceeds the first threshold and determines the non-occurrence of the change in the state of the monitor target when the signal from the sensor does not exceed the first threshold.

7. The electronic control unit according to claim 6, wherein:
  the threshold setter sets the first threshold to a value that is the same as the reference signal.

8. The electronic control unit according to claim 6, wherein:
  in the second determination, the controller determines the occurrence of the change in the state of the monitor target when the signal from the sensor exceeds a predetermined second threshold and determines the non-occurrence of the change in the state of the monitor target when the signal from the sensor does not exceed the second threshold.

9. The electronic control unit according to claim 8, wherein:
  the second threshold is larger than the first threshold.

10. The electronic control unit according to claim 1, wherein:
  the electronic control unit is mounted to a vehicle; and
  the sensor detects a state of the vehicle.

11. An electronic control unit that monitors a state of a monitor target based on an analog signal from a sensor which is supplied with electric power and which outputs the analog signal that changes in accordance with a value of the electric power and the state of the monitor target, the electronic control unit comprising:
  a first power supply;
  a second power supply having higher accuracy than the first power supply; and
  a controller that
    performs a first determination by supplying the power to the sensor with the first power supply and determining occurrence and non-occurrence of a change in the state of the monitor target based on the analog signal, and
    when determining the occurrence of the change in the state of the monitor target in the first determination, performs a second determination by switching over a power supply supplying the power to the sensor from the first power supply to the second power supply and determining occurrence and non-occurrence of the change in the state of the monitor target,
  wherein the controller includes a threshold setter that sets a first threshold based on a reference signal that is the signal outputted from the sensor at a time of transition of the electronic control unit from a wakeup state to a sleep state, wherein the first threshold is a threshold for distinguishing between the occurrence of the change in the state of the monitor target and non-occurrence of the change in the state of the monitor target; and
  wherein in the first determination, the controller determines the occurrence of the change in the state of the monitor target when the signal from the sensor exceeds the first threshold and determines the non-occurrence of the change in the state of the monitor target when the signal from the sensor does not exceed the first threshold.

* * * * *